W. FISKE.
BOX BLANK.
APPLICATION FILED MAR. 15, 1902.

899,212.  Patented Sept. 22, 1908.

WITNESSES:

INVENTOR:

UNITED STATES PATENT OFFICE.

WILSON FISKE, OF MEDFORD, MASSACHUSETTS, ASSIGNOR TO AMERICAN TYPE FOUNDERS COMPANY, OF NEW YORK, N. Y., A CORPORATION OF NEW JERSEY.

BOX-BLANK.

No. 899,212.     Specification of Letters Patent.     Patented Sept. 22, 1908.

Application filed March 15, 1902. Serial No. 98,392.

*To all whom it may concern:*

Be it known that I, WILSON FISKE, of Medford, in the county of Middlesex and State of Massachusetts, have invented a new and useful Improvement in Box-Blanks, of which the following is a specification.

My improvement relates to that class of box blanks which is used for the purpose of making a box having a bottom made in one piece and integral with both sides, and closed at all four edges and corners to prevent both the escape of the contents of the box and also the entrance into the box of vermin of any kind. Boxes of this class have been made, but heretofore the blanks have not been so shaped that they could be cut economically, and my invention has been made for the purpose of accomplishing this result.

My invention will be understood by reference to the drawings, in which

Figure 1:
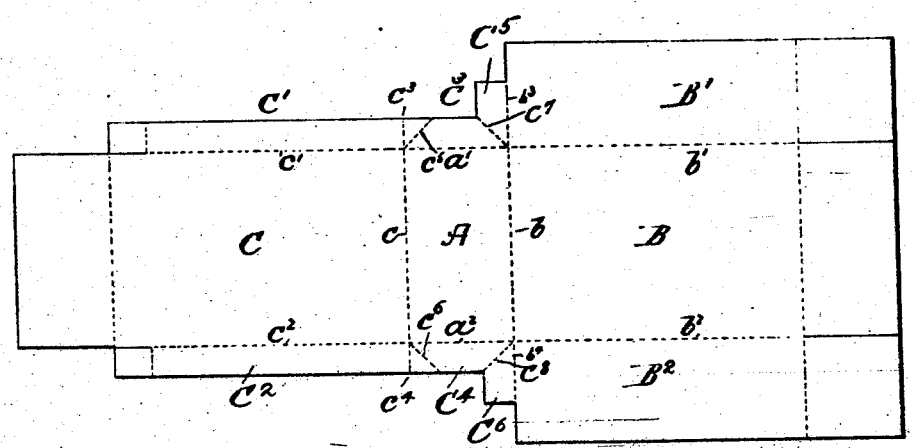
Figure 2:
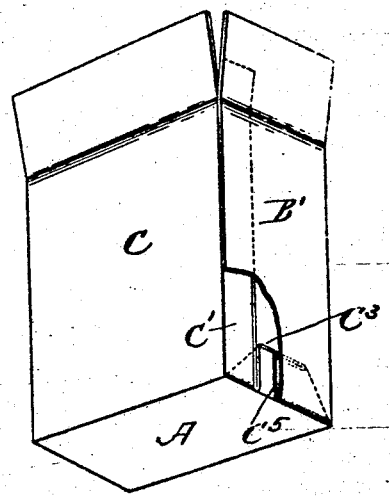

Figure 1 is a plan of the preferred form of blank embodying my invention; Fig. 2 being a box constructed from said blank.

This blank comprises a bottom piece A and two side pieces B and C, with the necessary top closing additions which are not described as they form no part of this invention. The side pieces are set off from the bottom piece preferably by creasing lines $b$, $c$, so that they may be easily folded along those lines to define the bottom piece. The side piece B has two end pieces $B^1$, $B^2$, set off from it by creasing lines $b^1$, $b^2$, and adapted to be folded around to form the ends of the box, and to engage with, and be gummed or otherwise fastened to, narrow gumming strips or flanges $C^1$, $C^2$, set off from the side piece C by creasing lines $c^1$, $c^2$. The creasing lines $b^1$, $b^2$, and $c^1$, $c^2$, are joined by creasing lines $a^1$, $a^2$, which define the ends of the bottom piece A, setting off therefrom a portion of the gumming strip. These various creasing lines may be slightly offset if desired to allow for the thickness of material in folding.

The main novelty of my invention lies in the extension of these narrow gumming strips along the edges of and integral with the bottom A of the box, and also integral with the bottom edge of the end pieces $B^1$, $B^2$, to form a closure for the edges and the corners of the bottom A where the ends $B^1$, $B^2$, and the gumming strips $C^1$, $C^2$ are turned in against the bottom A in forming the box. For this purpose the creasing line $c$ is extended as at $c^3$, $c^4$, across the gumming strips $C^1$, $C^2$, and from the corners where the creased lines $c^1$, $c^3$, and $c^2$, $c^4$ join, are run diagonal creasing lines $c^5$, $c^6$, with corresponding diagonal lines $c^7$, $c^8$, extending from the corners formed by the junction of the parts A, B, and $B^1$, $B^2$. These lines approach at substantially a right angle to each other, and enable these portions $C^3$, $C^4$ of the gumming strips $C^1$, $C^2$ to be turned upward and fit against the ends of the box. Such a construction, however, would be imperfect unless the gumming strips $C^1$, $C^2$ also are integral with the bottom of the ends $B^1$, $B^2$, as at $C^5$, $C^6$, being set off from the ends $B^1$, $B^2$ by the continuation $b^3$, $b^4$ of the creasing line $b$, so as to close in the corners of the finished box which are formed by the junction of A, B, $B^1$, $B^2$.

In making the box the blank when made in the preferred form shown in the drawings, is preferably gummed along the gumming strip, and the blank is then folded so that the edges of the end pieces engage the gummed surface on the gumming strips and seal the ends of the box. When the blank is folded in the preferred manner, the bottom A of the blank being clamped between a former and a clamping mechanism, the folding of the sides B, C, and of the portions $C^3$, $C^4$, of the gumming strips $C^1$, $C^2$ against the plunger, will cause the drawing in of the gumming strips $C^1$, $C^2$, and also the drawing in of the end pieces $B^1$, $B^2$ towards the plunger so that their edges may be readily caused to engage with the gumming strips $C^1$, $C^2$ to which gum has been previously applied, and the resultant box when constructed as shown in Fig. 2, where a portion of the end $B^1$ has been broken away from the blank shown in Fig. 1, when these parts are properly proportioned, will have three thicknesses of material, two of them gummed, lying along the greater part of the bottom portion of the end of the box so that any outside pressure necessary for closing and securing the box will be applied against a substantially even surface along this edge.

It will be noted that the gumming strips may be made very narrow compared with the width of the end pieces, so that the blanks may be cut from a strip or web of material the width of the length of the blank, the blanks being cut end for end, and the gumming strips of one blank lying close to the end pieces of the next blank. Thus the blanks may be cut with very little waste, and the ends of the box are made of only one thickness of material except along the edges where the ends engage the gumming strips.

What I claim as my invention is:

A box blank composed of cardboard or other suitable material, comprising a bottom section having attached thereto two side sections adapted to be bent at right angles to said bottom section so as to form the sides of said box, two end sections each integral with a side section and adapted to be bent at right angles to such side section to form the ends of the box, and two narrow gumming strips, each integral with a side section and adapted to engage an end section of the folded box, each of said gumming strips being prolonged integral with the bottom section to the opposing end section and integral therewith and being of substantially the same width throughout its entire length, whereby when the whole is folded to form a box, the said gumming strips will be folded so as to completely close the corners of the box and will form narrow strips in the interior across the ends of the box as well as along one edge of each of said ends, as described.

In testimony whereof, I hereunto set my name this eleventh day of March, 1902.

WILSON FISKE.

Witnesses:
 GEORGE O. G. COALE,
 M. E. FLAHERTY.